United States Patent [19]

Werner

[11] Patent Number: 4,858,866

[45] Date of Patent: Aug. 22, 1989

[54] RADIATOR RESTRAINING ASSEMBLY

[75] Inventor: Ronald H. Werner, Edgar, Wis.

[73] Assignee: J. I. Case Company, Racine, Wis.

[21] Appl. No.: 185,589

[22] Filed: Apr. 25, 1988

[51] Int. Cl.$^4$ ............................................. B60K 11/04
[52] U.S. Cl. .................................. 248/213.3; 248/635
[58] Field of Search ................... 248/635, 213.3, 213.4, 248/634, 638; 180/68.4, 68.5; 165/67

[56] References Cited

U.S. PATENT DOCUMENTS

| | | | |
|---|---|---|---|
| 1,370,880 | 3/1921 | Clawson | 296/35.1 |
| 1,660,671 | 2/1928 | Gurney | 180/68.4 |
| 1,948,193 | 2/1934 | Thompson | 248/635 |
| 2,059,313 | 11/1936 | Carter | 248/635 X |
| 2,912,057 | 11/1959 | Wagner | 180/68.4 |
| 3,351,309 | 11/1967 | Harrison | 248/635 |
| 3,929,201 | 12/1975 | Hoffman | 180/68.4 |
| 4,196,774 | 4/1980 | Hoffmann | 248/635 X |
| 4,519,467 | 5/1985 | Saunders | 180/68.4 |
| 4,651,839 | 3/1987 | Isobe | 180/68.4 |

Primary Examiner—Alvin C. Chin-Shue
Attorney, Agent, or Firm—Ralph T. Rader

[57] ABSTRACT

A radiator restraining assembly which permits limited flexing of the radiator while retaining it in its desired position. The radiator restraining assembly generally comprises a ring mounted to the radiator, a resilient bushing within the ring, and a fastener inserted into the bushing. The fastener includes a bearing portion which engages a washer element that is positioned between the bearing portion and the bushing. The restraining assembly holds the radiator in a desired position while allowing flexing of the unit about the axis of the fastener. Moreover, the construction provides longevity to the flexing and shock absorbing characteristics of the assembly.

1 Claim, 1 Drawing Sheet

4,858,866

RADIATOR RESTRAINING ASSEMBLY

BACKGROUND OF THE INVENTION

The present invention relates to a restraining assembly for radiators of the type that are used on large vehicles in the earth moving industry.

The size of earth moving vehicles and the nature of the environment and conditions in which they work results in considerable vibration and shock being applied to component parts including the radiator for the engine. A radiator for one of these large vehicles is typically secured by means of brackets and straps to the vehicle frame. A problem with this type of connection is the parts loosen, break, or wear out quickly when they are subjected to the vibration and shock stresses that are normally encountered by the vehicle. Thus, there has been a need for a radiator restraining assembly which holds the radiator in position while allowing flexing and limited movement of the radiator fore to aft, right to left, and up or down.

Therefore, it is the object of the present invention to provide a radiator restraining assembly which avoids the disadvantages of prior constructions and provides longer service life.

SUMMARY OF THE INVENTION

The radiator restraining assembly of the present invention is disclosed in association with a conventional radiator which is positioned within a metal wrapper that is secured in a conventional manner to a vehicle chassis. The restraining assembly generally comprises a metal ring, a resilient bushing, and a threaded stud fastener.

The metal ring is hollow and is welded or otherwise secured to an upper portion of the radiator. The ring is also cylindrical and may include a peripheral lip on one end thereof. The resilient bushing is also cylindrical and is positioned within the ring. The bushing includes a hollow center portion with a cylindrical metal sleeve being secured thereto. The bushing may also include a peripheral lip on one end thereof.

The threaded fastener extends downwardly through an opening in the top plate of the radiator wrapper for engagement within the interior of the bushing sleeve. The threaded fastener includes a threaded portion and a smooth cylindrical portion of a smaller diameter wherein a bearing surface is formed therebetween. The smooth portion of the fastener is in engagement with the interior of the bushing sleeve. A washer element is positioned between the fastener bearing surface and the resilient bushing. Thus, as the fastener is tightened against the washer element, the bushing is preloaded for retaining the radiator in its original position while allowing flexing of the unit.

The radiator restraining assembly of the present invention minimizes fore to aft movement and right to left movement of the radiator. Further, up and down movement of the radiator is minimized when using the construction of the assembly that includes a peripheral lip on the cylindrical ring and a peripheral lip on the resilient bushing. Flexing of the radiator unit is permitted to a limited extent about the longitudinal axis of the fastener. Further, limited relative movement for flexing is permitted by the smooth cylindrical portion of the fastener that fits within the bushing sleeve. Moreover, the resilient material of the bushing is sandwiched between the various metal surfaces to provide for longevity of the flexing and shock absorbing characteristics in the assembly.

Other advantages and meritorious features of the present invention will be more fully understood from the following description of the invention, the appended claims, and the drawings, a brief description of which follows.

DETAILED DESCRIPTION OF THE INVENTION

The radiator restraining assembly 10 of the present invention is illustrated in FIGS. 1-4. A conventional radiator 12 is shown within the engine compartment of a vehicle beneath a hood 14. The radiator 12 is positioned within a metal wrapper 16 which is secured in conventional manner to the vehicle chassis (not shown).

Figure 1:
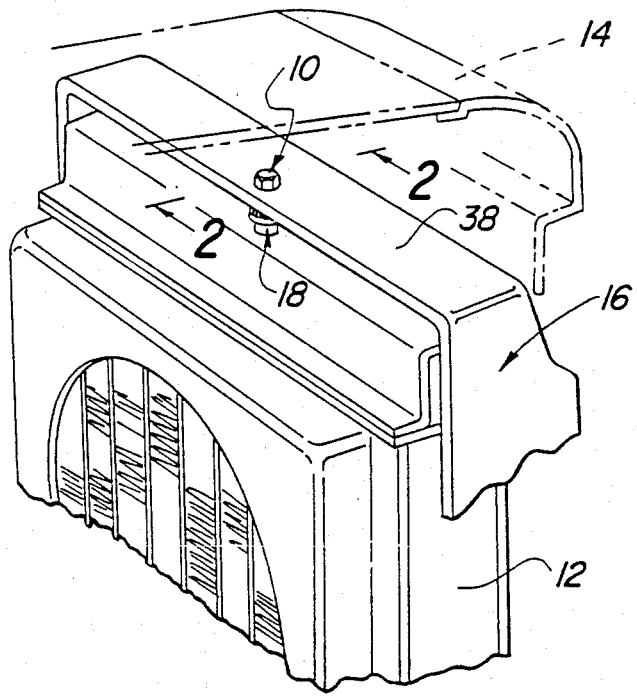
FIG. 1 is a partial perspective view illustrating a radiator including the radiator restraining assembly of the present invention.
Figure 2:
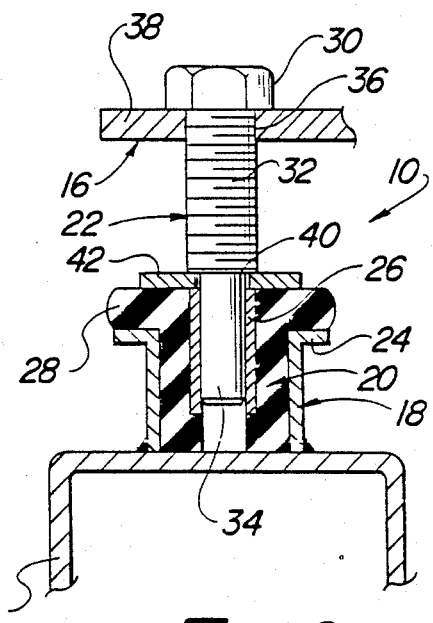
FIG. 2 is a cross sectional view taken along line 2—2 in FIG. 1.
Figure 3:
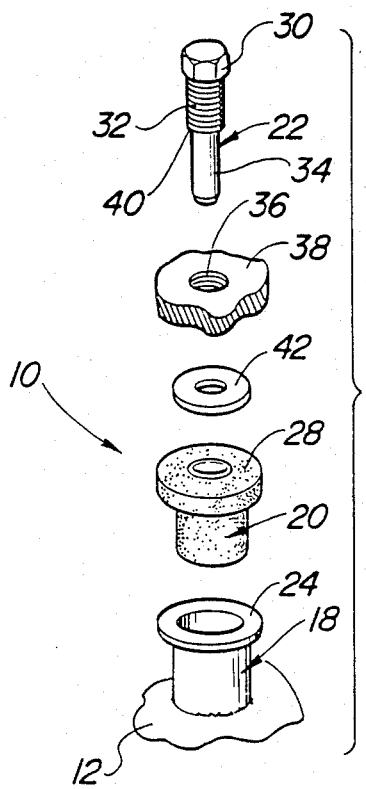
FIG. 3 is a perspective assembly view of the radiator restraining assembly.

As illustrated in FIGS. 2 and 3, the radiator restraining assembly 10 generally comprises a metal holder ring 18, a resilient bushing 20, and a threaded stud bolt or fastener 22. Bushing 20 is made of a resilient, shock absorbing material such as rubber. While only one assembly 10 is illustrated, it will be understood that multiple assemblies may be utilized along the top and/or bottom of radiator 12 to secure it in position in accordance with the teachings of the present invention.

Figure 4:
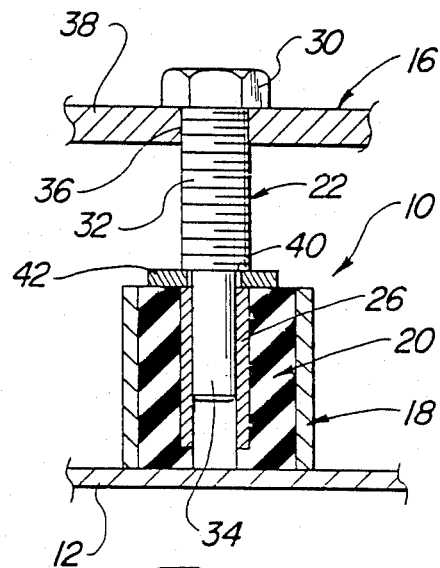
FIG. 4 is a view similar to FIG. 2 which illustrates the radiator restraining assembly without a peripheral lip on either the ring or bushing.

The hollow metal holder ring 18 of the assembly is welded or otherwise secured to a portion of the radiator 12. As shown in FIGS. 2-4, ring 18 is also cylindrical and may include a peripheral lip 24 on one end thereof. The generally cylindrical bushing 20 is positioned within ring 18 and includes a hollow center portion with a cylindrical metal sleeve 26 fitted therein and bonded thereto. Further, as shown in FIGS. 2 and 3, bushing 20 may include a peripheral lip 28 on one of its ends.

The threaded stud bolt connector or fastener 22 includes a head 30, a threaded portion 32, and a smooth cylindrical portion 34. The threaded portion 32 extends downwardly through an opening 36 in the top plate 38 of wrapper 16 with cylindrical portion 34 engaging the interior of sleeve 26. The smooth cylindrical portion 34 is smaller in diameter than threaded portion 32 such that a bearing surface 40 is formed for washer 42, which is positioned between bearing surface 40 and bushing 18.

Radiator restraining assembly 10 minimizes fore to aft movement and right to left movement of radiator 12. Further, up and down movement of the radiator is minimized when using the construction of the assembly 10 that is shown in FIG. 2. In operation, bushing 20 is preloaded by tightening fastener 22 against washer 42. This retains radiator 12 in its original position while allowing flexing of the unit about the longitudinal axis of fastener 22. Limited relative movement for flexing is permitted by providing the smooth cylindrical portion 34 that fits within metal sleeve 26. Moreover, the resilient material of bushing 20 is sandwiched between metal surfaces including ring 18, metal sleeve 26, washer 42, and radiator 12 to provide longevity to the flexing and shock absorbing characteristics of assembly 10.

It will be obvious to those skilled in the art that modifications can be made to the present construction without departing from the spirit and scope of the present invention, which is defined by the claims as follows.

I claim:

1. A radiator restraining assembly for holding a radiator in a desired position relative to a support member, said radiator having an end surface and said support member spaced from said end surface, said assembly comprising holder means attached directly to said radiator end surface, resilient bushing means mounted within said holder means, and connection means extending between said support member and said bushing means, and said connection means moveable for compressing said bushing means to retain said radiator in said desired position while allowing limited flexing of said radiator relative to said connection means;

said holder means comprises a cylindrical ring, said bushing means being generally cylindrical and having a hollow center portion with a generally cylindrical sleeve fitted therein, said sleeve having a length less than the length of the bushing means, said connection means includes a head portion which engages said support member and a threaded portion adjustably mounted within an opening in said support member and a smooth generally cylindrical portion engaging the interior of said bushing sleeve, said smooth portion having a width that is less than the width of said threaded portion, and a bearing surface formed between said portions of said connection means, and means positioned between said bearing surface and said bushing means for compressing said bushing means in response to movement of said threaded portion relative to said support member; and said generally cylindrical holder ring includes a peripheral lip at one end and said bushing means also includes a peripheral lip which is located between said compressing means and the peripheral lip of said holder ring.

* * * * *